United States Patent
Litwin et al.

(10) Patent No.: US 7,207,327 B2
(45) Date of Patent: Apr. 24, 2007

(54) FEEDBACK CONTROL METHOD FOR A HELIOSTAT

(75) Inventors: Robert Z Litwin, Canoga Park, CA (US); Christopher D Meister, Newbury Park, CA (US)

(73) Assignee: United Technologies Corporation, Hartford, CT (US)

( * ) Notice: Subject to any disclaimer, the term of this patent is extended or adjusted under 35 U.S.C. 154(b) by 259 days.

(21) Appl. No.: 10/868,567

(22) Filed: Jun. 15, 2004

(65) Prior Publication Data

US 2005/0274376 A1 Dec. 15, 2005

(51) Int. Cl.
*F24J 2/40* (2006.01)
*F24J 2/38* (2006.01)
*G01C 21/02* (2006.01)
*G02B 5/10* (2006.01)
*G03B 21/00* (2006.01)

(52) U.S. Cl. .................. 126/601; 126/600; 126/572; 126/573; 126/574; 126/578; 353/3; 359/853; 250/203 R

(58) Field of Classification Search .............. 126/572, 126/573, 574, 601, 600, 578, 714; 250/203 R; 359/853; 353/3
See application file for complete search history.

(56) References Cited

U.S. PATENT DOCUMENTS

| | | | | |
|---|---|---|---|---|
| 4,013,885 A | * | 3/1977 | Blitz | 250/203.4 |
| 4,211,922 A | * | 7/1980 | Vaerewyck et al. | 250/203.4 |
| 4,239,327 A | * | 12/1980 | Grant | 359/399 |
| 4,390,277 A | * | 6/1983 | Quinn | 356/613 |
| 4,564,275 A | * | 1/1986 | Stone | 353/3 |
| 5,127,735 A | * | 7/1992 | Pitt | 356/500 |
| 5,862,799 A | * | 1/1999 | Yogev et al. | 126/578 |
| 6,704,607 B2 | * | 3/2004 | Stone et al. | 700/56 |

* cited by examiner

*Primary Examiner*—Josiah Cocks
*Assistant Examiner*—Sarah Suereth
(74) *Attorney, Agent, or Firm*—Carlson, Gaskey & Olds

(57) ABSTRACT

An instrument for a solar energy system including a receiver and a heliostat to reflect solar energy on to the receiver. The instrument includes a first element adapted to form an image of the sun, a second element adapted to form an image of the receiver, and a detector. The detector is positioned to receive each of the images and a comparator is adapted to detect a distance between the images. The comparator generates an error correction signal based on the distance between the images. The error correction signal is received by a controller that controls the operation of a positioner that adjusts the position of the heliostat accordingly.

22 Claims, 6 Drawing Sheets

FEEDBACK CONTROL METHOD FOR A HELIOSTAT

FIELD OF THE INVENTION

The present invention relates to heliostat solar collectors, and more particularly to heliostat solar collectors that employ closed loop positioning systems.

BACKGROUND OF THE INVENTION

To reduce reliance on petroleum and coal based fuels, at least some utilities have turned to solar energy to replace, or augment, conventional electric power plants. In desert regions, where clear days predominate, the switch to solar energy is very desirable. Of several types of solar energy systems, the central solar receiver plant has proven to be a highly reliable and efficient producer of large commercial quantities of power. For example, central solar plants can produce 100 Mwe of power or more.

A solar central receiver plant uses a plurality of sun tracking mirrors called heliostats. The heliostats reflect and concentrate solar energy on to a central receiver. One such system is disclosed in co-pending U.S. application Ser. No. 09/879,363, Titled "Thermally Controlled Solar Facet With Heat Recovery", filed Jun. 12, 2001. Central receiver solar plants typically include a tall tower that holds the central receiver aloft to increase a field of view in order to allow many heliostats to focus energy upon the central receiver. A heat transfer fluid, e.g., molten salt, water, liquid metal, or air, flows through the central receiver absorbing the heat from the solar energy reflected by the heliostats. The heat is transferred through a turbine generator combination that utilizes the heat absorbed by the transfer fluid to create electric power.

In at least some conventional central receiver solar plants a preprogrammed controller controls the aiming of the heliostats. The controller continually predicts where the sun is and periodically positions the heliostat accordingly, e.g. every several seconds. Generally, the prediction is based on the date, time, longitude, latitude and elevation of the heliostat. Using the predicted sun location and the position of the receiver with respect to the heliostat, the controller calculates an azimuth and elevation angle for each heliostat. The azimuth and elevation angle are calculated so that each heliostat is position to reflect the sun light directly onto the receiver.

However, this aiming strategy is often inaccurate. Inaccuracies in the positioning of the heliostats results in efficiency losses of the central receiver solar plant. More specifically, if a heliostat fails to reflect the sun light directly on the receiver, a portion of the energy associated with the light will be lost. This type of energy loss is often referred to as spillage. Spillage reduces the efficiency of the system and often requires additional heliostats to compensate for the loss, which in turn adds significant plant costs. Additionally, the aiming inaccuracies can result in thermal damage to structures and devices near the receiver, which will also significantly increase plant costs. Furthermore, errors in the devices that physically adjust the position of each heliostat, for example, gear backlash and encoder errors can contribute significantly to heliostat positioning inaccuracies.

Generally, the heliostat fields of central receiver solar plants comprise between thirty and forty percent of the total capital investment needed for the overall solar plant. Therefore, increasing the accuracy and efficiency of a solar plant by increasing the number of heliostats or employing more expensive aiming device significantly increases plant costs.

Thus, a need exists to improve the methods and systems associated with positioning the heliostats in central receiver solar plants.

SUMMARY OF THE INVENTION

Generally, the present invention utilizes feed-forward predictive software to determine the general position of a solar plant heliostat. More particularly, the present invention provides apparatus and methods for closed loop control of the position of a movable heliostat used in a solar power receiver system. Briefly, the provided systems and methods utilize optics to provide feedback control to the heliostats so that they more accurately reflect solar energy onto a receiver. According to the principles of the present invention, a viewfinder acquires an image of the receiver and an image of the sun reflected off the movable heliostat. By superimposing the two images, the viewfinder detects whether an offset exists between the two images. If an offset is detected the viewfinder determines the magnitude and direction of the offset. The viewfinder then generates a position error signal used to re-position the heliostat, thereby improving the pointing accuracy of the heliostat.

In one preferred embodiment, the present invention provides a controller for a solar energy system that includes a receiver and a heliostat to reflect solar energy on to the receiver. The controller includes an optical element and a comparator. In one preferred form, the optical element includes a retro reflector, a beam splitter, various lenses and a detector. The optical element forms an image of the sun and an image of the receiver. The splitter reflects the image of the sun to the retro reflector and the image of the receiver to the detector. The retro reflector then reflects the image of the sun to the beam splitter, which in turn, transmits the images to the detector and comparator. The comparator determines a distance between the two images and outputs an error signal representative of that distance.

Additionally, in one preferred form, the system includes a positioner or encoder that receives the error signal from the detector. The positioner responds to the signal by adjusting the position of the heliostat in response to the signal. In order to adjust the position of the heliostat, the positioner or encoder may have a drive subsystem including motors, hydraulics, pneumatics, chains, cables, or gear trains.

Thus, the present invention essentially continuously compensates for positional errors of the heliostat and accurately compensates for such errors so that for the heliostats efficiently direct the solar energy on to the receiver.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
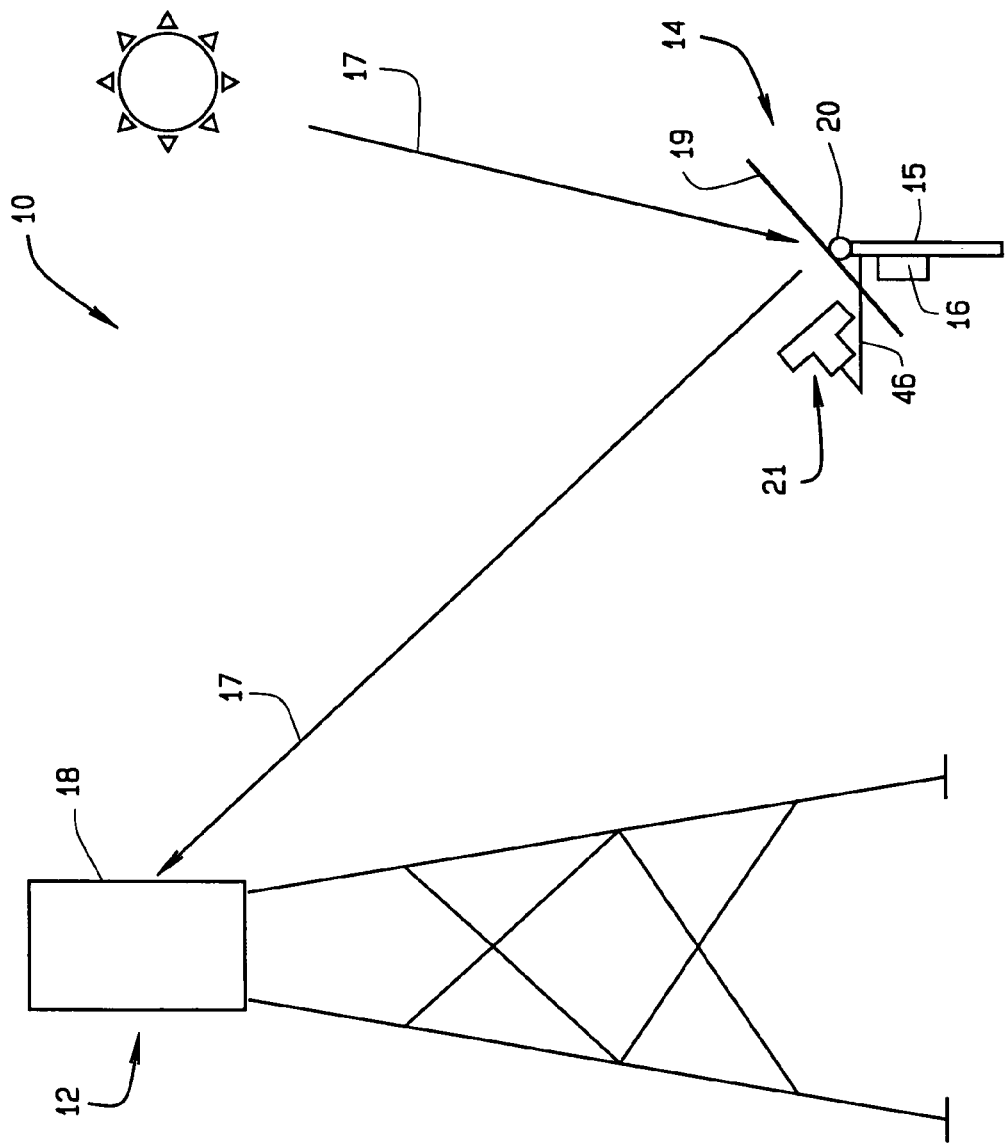
FIG. 1 is an elevation view of a solar energy system in accordance with a preferred embodiment of the present invention.

FIG. 1 illustrates an exemplary solar energy system 10 in accordance with a preferred embodiment of the present invention. The system 10 includes a receiver 12 and at least one heliostat 14. Both the receiver 12 and the heliostat 14 are fixed in location by their respective support structures. Specifically, the heliostat may be supported by a pedestal 15.

In operation, a controller 16 positions the heliostat 14 using a feed forward, sun-tracking equation, also referred to herein as a prediction equation. Light energy 17 from the sun reflects off the heliostat 14 and is directed toward a surface 18 of the receiver 12. The light energy 17 can be any frequency of light, for example, the light energy 17 can be visible light, infrared light or near infrared light. The heliostat 14 includes a reflective surface 19, also referred to as a heliostat sun face, that can be any suitable reflective surface such as glass, film, polished metal, etc. Additionally, the reflective surface 19 can have flat or slightly concave configuration adapted to focus the light energy 17 onto the receiver 12.

Since the sun moves relative to the heliostat 14, in a preferred form, the heliostat includes a steering, or positioning subsystem 20, referred to herein as positioner 20. In conventional systems, the positioning subsystem typically included high precision gearing and motors for azimuth and elevation movement and encoders to measure position. However, the high precision gearing and motors were susceptible to inaccuracies, failures and errors that resulted in spillage, i.e. energy loss. Alternatively, the heliostat user of conventional systems had to accept imperfect positioning of the heliostat resulting from less precise mechanical components. Moreover, because of the large number of heliostats, typically thousands, required to produce commercial quantities of energy, the use of high precision, costly gearing increased the cost of the system significantly. However, the positioner 20 of the present invention includes low cost gearing, chains, cables, hydraulics, pneumatics and the like, yet still functions to accurately position the reflective surface 19 due to continuous feedback control as described below.

Figure 2:
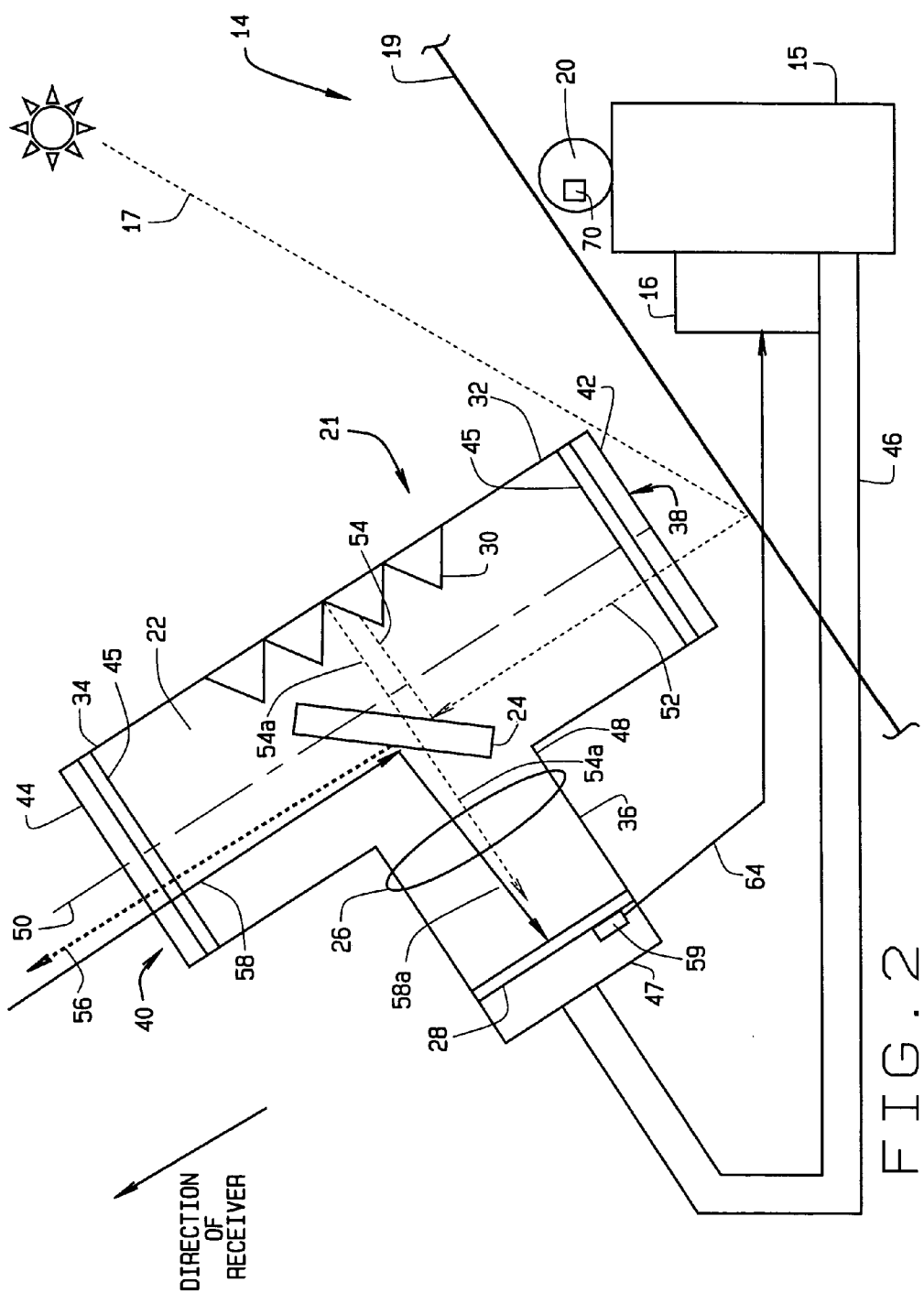
FIG. 2 is a cross sectional view of a heliostat in accordance with the principles of the present invention.

FIG. 2, is a simplified cross sectional schematic illustrating an instrument 21 that provides feedback position control to the heliostat 14. The instrument 21 includes a housing 22, a beam splitter 24, an objective lens 26, an image (or photo) detector 28, and a retro reflector 30. In one preferred form the housing 22 has a T shaped form including a proximal end 32, a distal end 34, and a well 36. The well 36 extends orthogonally from a longitudinal axis extending between the proximal and distal ends 32 and 34. Additionally, the proximal and distal ends 32 and 34 each define an optically transparent opening 38 and 40 respectively. Preferably, the transparent openings 38 and 40 respectively include focal lenses 42 and 44 positioned therein. In one preferred embodiment, at least one of the openings 38 and 40 include an optical attenuator 45 to reduce the quantity of light energy entering the instrument 21. In an alternative implementation, the attenuator 45 is included in the focal lenses 42 and 44.

A mount 46 rigidly attaches the instrument 21 to the pedestal 15. Moreover, the instrument 21 is located between the reflective surface 19 and the receiver 12 and angled so that the transparent opening 40 and axis 50 always point toward the receiver 12. The mount 46 maintains the instrument 21 in fixed relationship to the receiver 12.

Relative to each other, the image detector 28, objective lens 26, beam splitter 24, and retro reflector 30 are placed as follows. The image detector 28 is placed near a first end 47 of the well 36 with the objective lens 26 placed near a second end 48 of the well 36. The distance between the objective lens 26 and the image detector 28 is such that the image detector 28 lies in the focal plane of the objective lens 26. Additionally, the retro reflector 30 is preferably positioned inside the housing 22 adjacent the well 36 with the beam splitter 24 placed therebetween. In one preferred embodiment, the beam splitter 24 is angled at 45 degrees from an axis 50 extending longitudinally between the ends 38 and 40. Preferably, the geometry of the optical components is such that an image of the receiver 12 and an image of the sun are received at the same location, preferably the center, of the image detector 28 when the heliostat 14 reflects sun light directly at the receiver 12.

In operation, at least a portion of the light energy 17, indicated in FIG. 2 by the reference numeral 52, reflects off the reflective surface 19 and enters the transparent opening 38 nearest the reflective surface 19. When focused, the reflected light 52 will form an image, or at least a portion of an image, of the sun. If the opening 38 includes an attenuator 45, the amount of reflected light 52 entering the housing 22 is reduced. Reducing the amount of reflected light 52 that enters the housing 22 creates a more manageable signal and less internal heating than would otherwise be the case. Accordingly, saturation and heat related distortions of optical components included in the instrument 21, e.g. beam splitter 24, objective lens 26, image detector 28 and retro reflector 30, may be reduced.

The mount 46 maintains the instrument 21 in a fixed relationship with the receiver 12 such that axis 50 is always pointing directly at the receiver 12. Therefore, if the reflective surface 19 directs the reflected light 52 directly to the receiver 12, the reflected light 52 will be parallel with the axis 50 as the reflected light 52 enters the transparent opening 38. It should be understood that the reflected light portion 52 is representative of the remaining bulk of light energy 17 reflected off the reflective surface 19 that does not enter the transparent opening 38. That is, the reflected light portion 52 is parallel with the remaining bulk of light energy 17 reflected off the reflective surface 19.

After the reflected light 52 enters the instrument 21, via transparent opening 38, the reflected light 52 travels to the beam splitter 24 whereupon the beam splitter 24 splits the reflected light 52 into a first portion 54 and a second portion 56. Because of the angle and optical properties of the beam splitter 24, the beam splitter reflects a portion of the reflected light, i.e. the first portion 54, toward the retro reflector 30. Due to the semi-transparent properties of the beam splitter 24, the beam splitter 24 transmits a larger remaining portion of the light, i.e. the second portion 56, on toward the distal end 34 of the instrument 21. Accordingly, because the beam splitter 24 allows most of the reflected light 52 to pass through the instrument 21 little solar energy is absorbed in the instrument 21.

The first portion of light 54 from the beam splitter 24 reflects off the retro reflector 30 as the portion 54*a* directly back in the direction from which the portion 54 came. Specifically, because of the pre-selected optical properties of the retro reflector 30, the retro reflector 30 reflects the portion 54*a* in parallel to the portion 54 but in the opposite direction. The portion 54*a* travels from the retro reflector 30, through the semi-transparent beam splitter 24, to the objective lens 26. The objective lens 26 focuses the portion 54*a* on to the image detector 28.

Contemporaneously, an image 58, i.e. reflected light, from the receiver 12 passes through the transparent opening 40 of the distal end 34 and through the focal lens 44 (and attenuator 45 if applicable) to the beam splitter 24. Because, the transparent opening 40 is fixed, and normal to the axis 50, such that it points toward the receiver 12, as described above, the receiver image 58 will be directed parallel to the axis 50. The receiver image 58 strikes the beam splitter 24 from the opposite side as does the reflected light 52. From this side, the beam splitter 24, acting as a mirror, reflects the receiver image 58 toward the objective lens 26 as image light 58*a*. In turn, the objective lens 26 also focuses the image light 58*a* onto the image detector 28. Accordingly, when the reflective surface 19 reflects sun light 17 directly toward the receiver 12, the reflected light 52 and the receiver image light 58 both parallel the axis 50. The portion 54*a* of the reflected light first portion 54 and the image light 58*a* respectively carrying images of the sun and the receiver 12, converge on each other at the image detector 28. Thus, the images of the sun and the receiver 12 carried by the light portion 54*a* and the image light 58*a* will be effectively centered at essentially the same location on the image detector 28.

Figure 3:
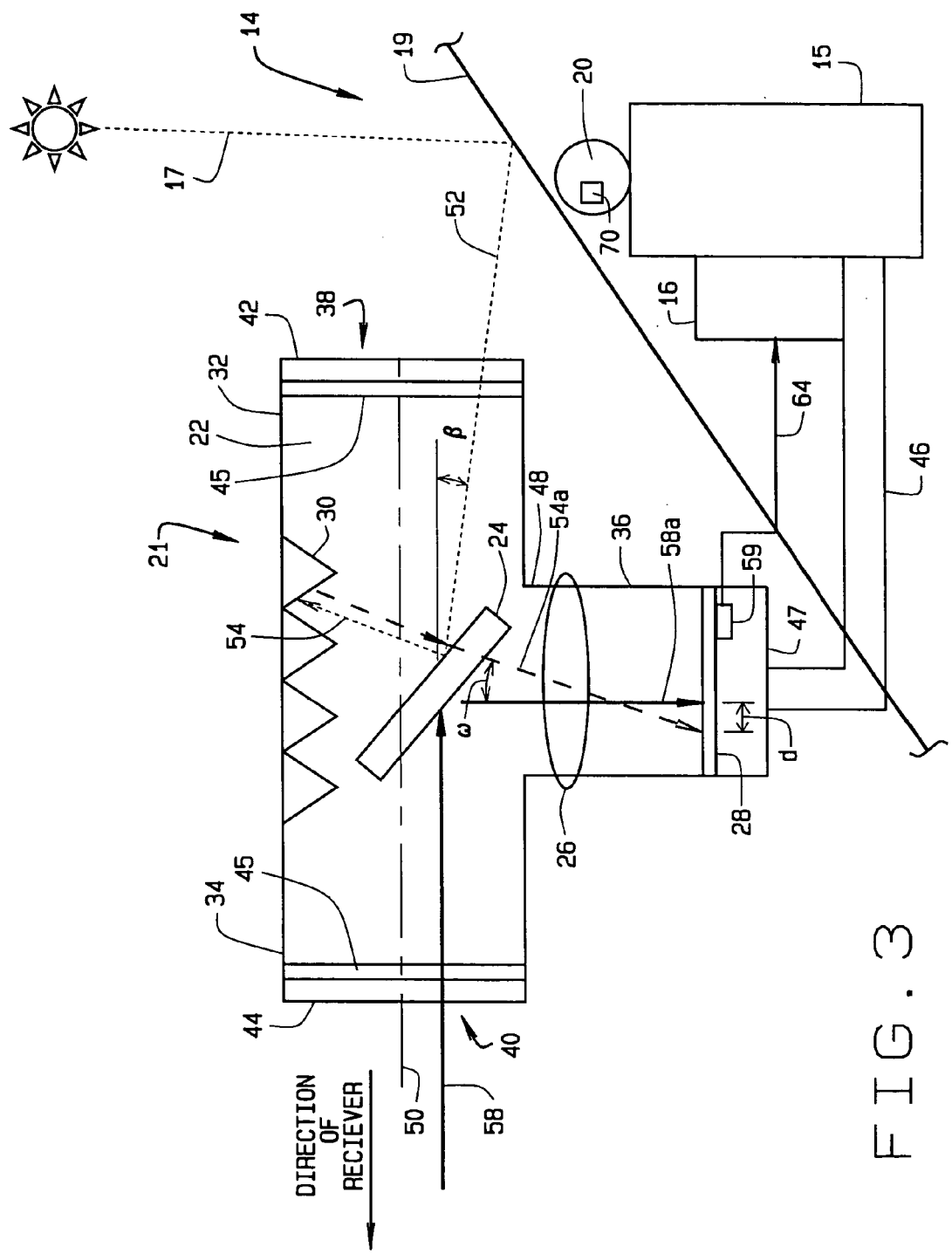
FIG. 3 is a cross sectional view of the heliostat shown in FIG. 2 when a positional error occurs.

FIG. 3 is a simplified cross sectional schematic illustrating the operation of the instrument 21 when a positional error of the reflective surface 19 occurs. Should a disturbance, error, inaccuracy, or noise cause a pointing error of the sun's reflect light rays 52, then the instrument 21 operates as follows. It should be noted that the image of the receiver 12 carried by receiver image 58 and image light 58*a* will still be centered on the same location of the image detector 28 because the receiver image 58 remains parallel to the axis 50. In contrast, the reflected light portion 52 from the sun now enters the instrument 21 at an angle β from the axis 50. Accordingly, the light portion 54*a* of the reflected light first portion 54 travels at an angle w from the receiver image toward the objective lens 26.

Therefore, the objective lens 26 focuses the light portion 54*a* on the image detector 28 at a random location a distance d from the location where image light 58*a* is focused on the image detector 28. The distance d represents the magnitude of the pointing error. Those skilled in the art will also recognize that while the foregoing discussed the instrument 21 as if it were only measuring elevation pointing error, the instrument 21 also measures azimuth related pointing errors.

It should also be noted that the image detector 28 may have devices well known in the art associated with it to analyze the images of the receiver 12 and the sun. For example, in a preferred embodiment, the detector 28 includes a comparator 59 that determines the error distance d. Moreover, because the appearance of the receiver image 58 and the image of the sun in reflected light first portion 54 is known in advance, or can be recorded, the image detector 28 may be programmed to recognize the images of the receiver 12 and sun. Once recognized, the centers of the two images may be identified by the detector 28 and the distance d measured.

In one preferred embodiment, the comparator 59 generates an error signal 64 representative of the distance d that indicates the pointing error. The error signal 64 is then transmitted to the controller 16 associated with the positioner 20. Using the error signal 64, the controller 16 commands the positioner 20 to move the reflective surface 19 until the error distance d is approximately equal to zero, preferably effectively equal to zero. An encoder 70 attached to the positioner 20 indicates the relative motion or position of the reflective surface 19. Thus, despite the potential presence of various error sources, the system 21 provides accurate, precise, closed loop feedback control for the positioning of the heliostat 14.

Figure 4:
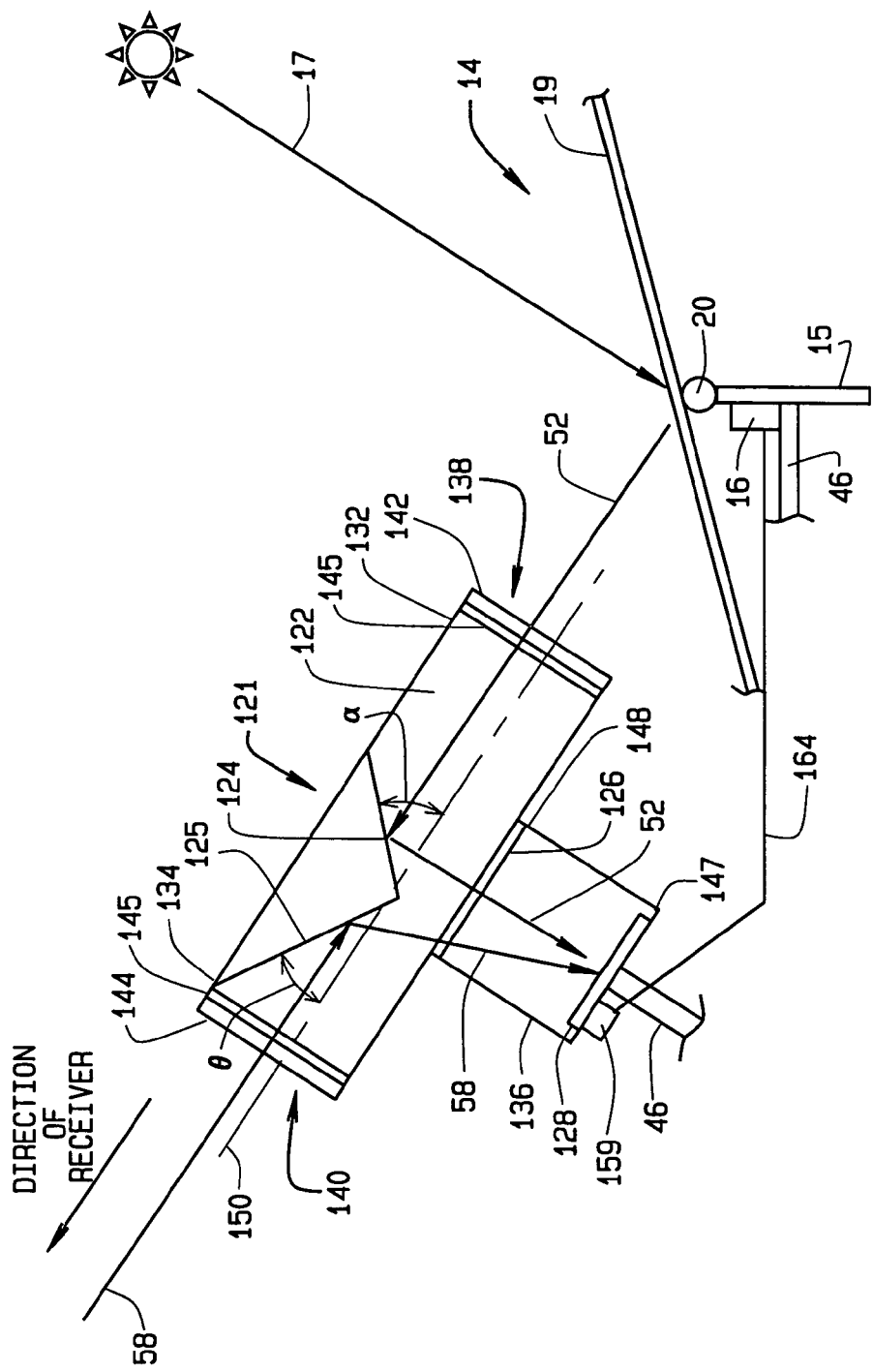
FIG. 4, is a simplified cross sectional schematic illustrating an alternate embodiment of the instrument shown in FIG. 2.

FIG. 4, is a simplified cross sectional schematic illustrating an instrument 121, in accordance with an alternate embodiment of the system 10 shown in FIG. 1. Components of the instrument 121 illustrated in FIG. 4 that are identical to components of the instrument 21 illustrated in FIG. 2, and described above, are identified in FIG. 4 by reference numerals increased by one hundred from the reference numerals in FIG. 2. Thus, the instrument 121 includes a housing 122, an objective lens 126 and an image (or photo) detector 128. Additionally, the instrument 121 includes a first reflecting mirror 124 and a second reflecting mirror 125. The proximal and distal ends 132 and 134 of the housing 122 each define an optically transparent opening 138 and 140 respectively. Preferably, the transparent openings 138 and 140 respectively include focal lenses 142 and 144 positioned therein. Furthermore, in one preferred embodiment, at least one of the openings 138 and 140 include an optical attenuator 145 to reduce the quantity of light energy entering the instrument 121.

Importantly, as described above, the instrument 121 is angled so that the transparent opening 140 always points toward the receiver 12. The mount 46 maintains the instrument 121 in fixed relationship to the receiver 12. The distance between the objective lens 126 and the image detector 128 is such that the image detector 128 lies in the focal plane of the objective lens 126. The first reflecting mirror 124 is positioned at a fixed angle α from the axis 150 and the second reflecting mirror 125 is positioned at a fixed angle θ from the axis 150. In a preferred form the angle α is approximately equal to 45° and the angle θ is generally less than 45°.

In operation, at least a portion of the light energy 17, indicated in FIG. 4 by the reference numeral 52, reflects off the reflective surface 19 and enters the transparent opening 138 nearest the reflective surface 19. When focused, the reflected light 52 will form an image of the sun. If the opening 138 includes an attenuator 145, the amount of reflected light 52 entering the housing 122 is reduced. Reducing the amount of reflected light 52 that enters the housing 122 creates a more manageable signal and less internal heating than would otherwise be the case. Accordingly, saturation and heat related distortions of optical components included in the instrument 121, e.g. first reflective mirror 124, second reflective mirror 125, objective lens 126 and image detector 128, may be reduced.

The mount 46 maintains the instrument 121 in a fixed relationship with the receiver 12 such that axis 150 is always pointing directly at the receiver 12. Therefore, if the reflective surface 19 directs the reflected light 52 directly to the receiver 12, the reflected light 52 will be parallel with the axis 150 as the reflected light 52 enters the transparent opening 138. It should be understood that the reflected light portion 52 is representative of the remaining bulk of light energy 17 reflected off the reflective surface 19 that does not enter the transparent opening 138. That is, the reflected light portion 52 is parallel with the remaining bulk of light energy 17 reflected off the reflective surface 19.

After the reflected light 52 enters the instrument 121, via transparent opening 138, the reflected light 52 travels to the first reflective mirror 124 and is reflected in the direction of the objective lens 126. The objective lens 126 focuses the reflected light 52 on to the image detector 128.

Contemporaneously, an image 58, i.e. reflected light, from the receiver 12 passes through the transparent opening 140 of the distal end 134 and through the focal lens 144 (and attenuator 145 if applicable) to the second reflecting mirror 125. Because, the transparent opening 140 is fixed such that it points toward the receiver 12, as described above, the receiver image 58 will be directed parallel to the axis 150. The receiver image 58 strikes the second reflecting mirror 125 and is reflected in the direction of the objective lens 126. The objective lens 126 focuses the receiver image 58 on to the image detector 128. When the reflected light 52 enters the instrument 121 parallel to axis 150 the angle θ is fixed such that the reflected light 52 and the receiver image 58 strike the image detector 128 at essentially the same location. In a preferred form the reflected light 52 and the receiver image 58 strike the image detector at the center of the image detector 128.

Figure 5:
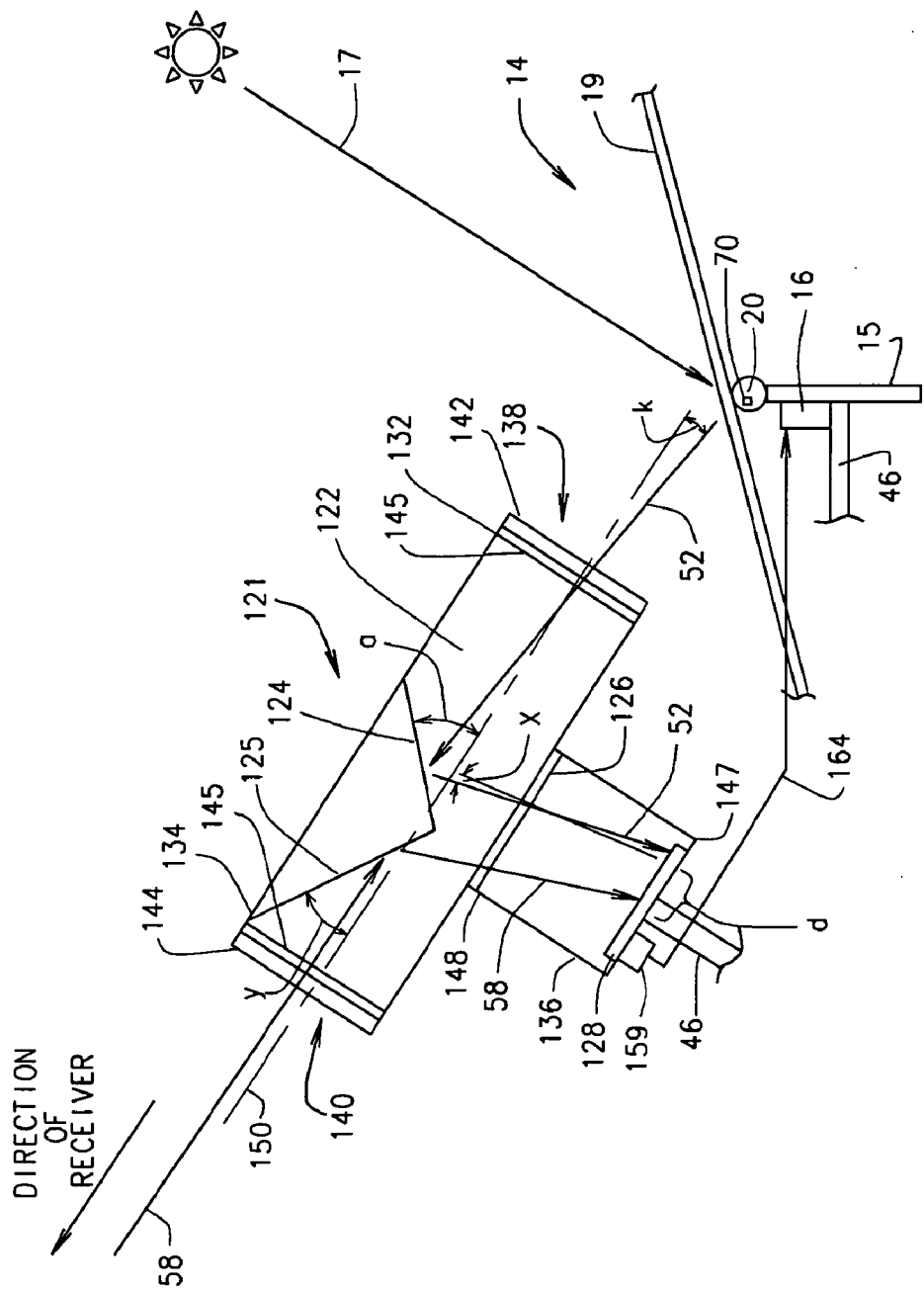
FIG. 5 is a cross sectional view of the heliostat shown in FIG. 4 when a positional error occurs.

FIG. 5 is a simplified cross sectional schematic illustrating the operation of the instrument 121 when a positional error of the reflective surface 19 occurs. Should a disturbance, error, inaccuracy, or noise cause a pointing error of the sun's reflect light rays 52, then the instrument 121 operates as follows. It should be noted that due to the fixed position of the instrument 121, with respect to the receiver 12, and the fixed angle θ of the second reflecting mirror 125, the image of the receiver 12 carried by receiver image 58 will strike the image detector 128 at the same location as describe above in reference to FIG. 4. However, the reflected light portion 52 from the sun now enters the instrument 121 at an angle A from the axis 150. Therefore, after striking the first reflecting mirror 124, the reflected light 52 travels at an angle Ω from the receiver image 58 toward the image detector 128.

Specifically, the objective lens 126 focuses the reflected light 52 on the image detector 128 at the distance d from the location where receiver image 58 is focused on the image detector 128. The distance d represents the magnitude of the pointing error. Those skilled in the art will also recognize that while the foregoing discussed the instrument 121 as if it were only measuring elevation pointing error, the instrument 121 also measures azimuth related pointing errors.

It should also be noted that the image detector 128 may have devices well known in the art associated with it to analyze the images of the receiver 12 and the sun. For example, in a preferred embodiment, the image detector 128 includes a comparator 159 that determines the error distance d. Moreover, because the appearance of the receiver image 58 and the image of the sun in reflected light 52 is known in advance, or can be recorded, the image detector 128 may be programmed to recognize the images of the receiver 12 and sun. Once recognized, the centers of the two images may be identified by the detector 128 and the distance d measured.

In one preferred embodiment, the comparator 159 generates an error signal 164 representative of the distance d that indicates the pointing error. The error signal 164 is then transmitted to the controller 16 associated with the positioner 20. Using the error signal 164, the controller 16 commands the positioner 20 to move the reflective surface 19 until the error distance d is approximately equal to zero, preferably effectively equal to zero. The encoder 70 attached to the positioner 20 indicates the relative motion or position of the reflective surface 19. Thus, despite the potential presence of various error sources, the system 121 provides accurate, precise, closed loop feedback control for the positioning of the heliostat 14.

Figure 6:
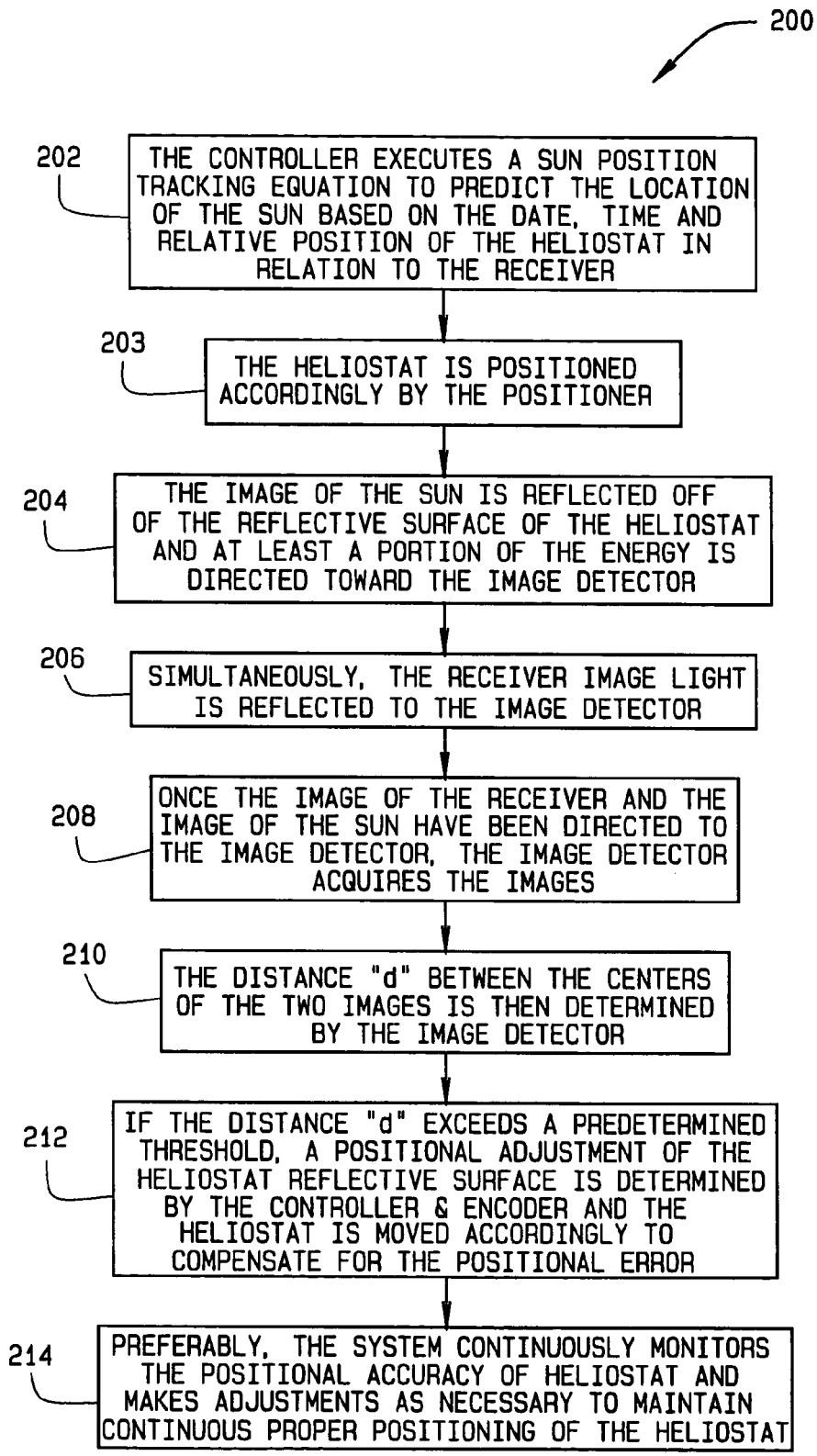
FIG. 6 is a flowchart of a method of operation of the system shown in FIG. 1, in accordance with the present invention.

Turning now to FIG. 6, showing a flowchart 200 of the operation of the system 10, shown in FIGS. 1–5, in accordance with a preferred form of the present invention. The controller 16 executes a sun position tracking equation to predict the location of the sun based on the date, time, and the location of the heliostat 14 relative to the receiver 12, as indicated at 202. Each heliostat 14 is then positioned accordingly by the related positioner 20, as indicated at 203. The image of the sun is reflected off of the reflective surface 19 and at least a portion of the energy is directed toward the image detector, as indicated at 204. Simultaneously, the receiver image light is reflected to the image detector, as indicated at 206.

Once the image of the receiver and the image of the sun have been directed to the image detector, the image detector acquires the images, as indicated at 208. The distance d between the centers of the two images is then determined by the image detector, as indicated at 210. If the distance d exceeds a predetermined threshold, a positional adjustment of the heliostat reflective surface 19 is determined by the controller 16 and the heliostat is moved accordingly to compensate for the positional error, as indicated at 212. In a preferred embodiment, the system 10 continuously monitors the positional accuracy of heliostat 14 and makes adjustments as necessary to maintain continuous proper positioning of the heliostat 14, as indicated at 214. Preferably, the frequency of this feedback is typically every few seconds. In the alternative, if continuous tracking is not desired then the heliostat reflective surface 19 may be left in its last commanded position or returned to a neutral position as desired.

Thus, those skilled in the art will recognize that the present invention reduces thermal energy spillage. Moreover, systems and methods in accordance with the principals of the present invention operate more efficiently and with less spillage and related damage than the prior art. Furthermore, because of the improved positioning provided by the present feedback control invention, fewer heliostats are required to produce electric energy. Additionally, the positioning subsystem of the heliostat may use less costly components, yet deliver better pointing accuracy than previously developed pointing systems that utilize feed forward control.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A closed loop error detection system for determining a positioning error of a heliostat relative to a receiver of a solar energy plant, the system comprising:

a positional error detection instrument positioned adjacent a face of the heliostat and between the heliostat face and the receiver, the positional error correction instrument comprising:

an image detector configured to:

receive a reflected image of the sun at a random location on the image detector that is based on a reflection angle of the image of the sun as the image of the sun is reflected from the heliostat face; and receive an image of the receiver at a fixed location on the image detector, the receiver image reflected from the receiver directly into the positional error detection instrument; and a comparator configured to:
determine a distance between the randomly located image of the sun and the fixed location of the receiver image, the distance representing a pointing error of the heliostat relative to the receiver, and generate a pointing correction signal based on the pointing error;

a controller configured to receive the pointing correction signal; and a positioner configured to be controlled by the controller to adjust the position of the heliostat to eliminate the pointing error.

2. The system according to claim 1, wherein the image detector is further adapted to detect at least one of visible, infrared, and near infrared light.

3. The system according to claim 1, wherein the pointing correction signal is proportional to the distance between the images.

4. The system according to claim 1, wherein the positional error detection instrument further comprises a beam-splitting mirror positioned to constantly reflect the image of the receiver toward the fixed location of the image detector.

5. The system according to claim 4, wherein the positional error detection instrument further comprises a retro reflector, wherein the beam-splitting mirror is further positioned to reflect a portion of the image of the sun toward the retro reflector and allow the remainder of the image of the sun to pass through the beam-splitting mirror.

6. The system according to claim 5, wherein the retro reflector is adapted to reflect the image of the sun toward the random location of the image detector determined by the positioning error of the heliostat.

7. The system according to claim 1, wherein the positional error detection instrument further comprises a first reflecting mirror adapted to reflect the image of the sun toward a random location of the image detector determined by the positioning error of the heliostat.

8. The system according to claim 7, wherein the positional error detection instrument further comprises a second reflecting mirror adapted to reflect the image of the receiver toward a fixed location of the image detector.

9. A positional error detection instrument for a solar energy system, said instrument comprising:
a first transparent opening configured to receive reflected light energy from the sun reflected off a face of a heliostat of the solar energy system, the light energy carrying an image of the sun;

a second transparent opening at an opposing end of the instrument, the second opening configured to contemporaneously directly receive an image of a receiver of the energy system;

an image detector positioned to receive the reflected image of the sun at a random location on the image detector that is based on a reflection angle of the image of the sun as the image of the sun is reflected off the face of the heliostat and the image of the receiver at a fixed location on the image detector, the receiver image reflected from the receiver directly into the positional error detection instrument; and a comparator configured to determine a distance between the centers of the images received by the detector, the distance representing a pointing error of the heliostat relative to the receiver.

10. The instrument according to claim 9, further comprising a beam-splitting mirror positioned to constantly reflect the image of the receiver toward a fixed location of the image detector.

11. The instrument according to claim 10, further comprising a retro reflector, wherein the beam-splitting mirror is further positioned to reflect a portion of the image of the sun toward the retro reflector and allow the remainder of the image of the sun pass through the beam-splitting mirror.

12. The instrument according to claim 11, wherein the retro reflector is adapted to reflect the image of sun toward the random location of the image detector determined by the positioning error of the heliostat.

13. The instrument according to claim 9, further comprising a first reflecting mirror adapted to reflect the image of the sun toward a random area location of the image detector determined by the positioning error of the heliostat.

14. The instrument according to claim 13, further comprising a second reflecting mirror adapted to reflect the image of the receiver toward the fixed location of the image detector.

15. The instrument according to claim 11, further comprising a fixed unmovable mount adapted to couple to the heliostat.

16. The instrument according to claim 9, wherein the detector is further adapted to detect at least one of visible, infrared, and near infrared electromagnetic radiation.

17. A method of focusing solar energy on a solar energy receiver using a heliostat, comprising:
fixedly attaching a positional error detection instrument to a pedestal having a heliostat movably mounted thereto such that the position error detection instrument is stationarily positioned adjacent a movable face of the heliostat and between the heliostat face and the receiver such that the detection instrument receives an image of the sun reflected from the heliostat face through a first transparent opening of the detection instrument and an image of the receiver through a second transparent opening of the detection instrument;

directing the image of the receiver toward a fixed area of an image detector, the receiver image reflected from the receiver directly into the positional error detection instrument;

directing the reflected image of the sun toward a random area of the image detector based on a positioning error of the heliostat;

determining a distance between the images on the image detector utilizing a comparator; and adjusting a position of the heliostat based on the distance.

18. The method according to claim 17, wherein directing the image of the receiver comprises positioning a beam-splitting mirror to constantly reflect the image of the receiver toward the fixed area of the image detector.

19. The method according to claim 18, wherein directing an image of the sun comprises positioning the beam-splitting mirror to reflect a portion of the image of the sun toward a retro reflector and allow the remainder of the image of the sun pass through the beam-splitting mirror.

20. The system according to claim 19, wherein directing an image of the sun further comprises reflecting the image of sun from the retro reflector toward the random area of the image detector.

21. The system according to claim 17, wherein directing an image of the sun comprises reflecting the image of the sun from a first reflecting mirror toward a random area of the image detector determined by the positioning error of the heliostat.

22. The system according to claim 21, wherein directing the image of the receiver comprises reflecting the image of the receiver from a second reflecting mirror toward the fixed area of the image detector.

* * * * *

UNITED STATES PATENT AND TRADEMARK OFFICE
CERTIFICATE OF CORRECTION

| | | |
|---|---|---|
| PATENT NO. | : 7,207,327 B2 | Page 1 of 1 |
| APPLICATION NO. | : 10/868567 | |
| DATED | : April 24, 2007 | |
| INVENTOR(S) | : Litwin et al. | |

It is certified that error appears in the above-identified patent and that said Letters Patent is hereby corrected as shown below:

Claim 13, Column 10, line 21: Please delete "area"

Signed and Sealed this

Twenty-sixth Day of June, 2007

JON W. DUDAS
*Director of the United States Patent and Trademark Office*